US008301075B2

(12) United States Patent
Sherman et al.

(10) Patent No.: US 8,301,075 B2
(45) Date of Patent: Oct. 30, 2012

(54) TACTICAL RADIO AND RADIO NETWORK WITH ELECTRONIC COUNTERMEASURES

(75) Inventors: Matthew J. Sherman, Succasunna, NJ (US); Rachel E. Learned, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 493 days.

(21) Appl. No.: 12/719,974

(22) Filed: Mar. 9, 2010

(65) Prior Publication Data

US 2010/0289688 A1 Nov. 18, 2010

Related U.S. Application Data

(60) Provisional application No. 61/216,178, filed on May 14, 2009, provisional application No. 61/181,931, filed on May 28, 2009.

(51) Int. Cl.
*H04K 3/00* (2006.01)

(52) U.S. Cl. ...... 455/1; 455/67.11; 455/426.1; 455/455; 455/456.4; 375/133; 375/346; 342/14; 342/16; 340/539.1

(58) Field of Classification Search ........... 455/1, 67.11, 455/403, 422.1, 423, 426.1, 450, 455, 456.4, 455/456.6, 550.1; 375/133, 346, 350; 342/14, 342/16; 340/539.1
See application file for complete search history.

(56) References Cited

U.S. PATENT DOCUMENTS

| 4,743,905 | A | 5/1988 | Wiegand |
| 6,112,052 | A | 8/2000 | Guthrie et al. |
| 6,229,998 | B1 | 5/2001 | Hamdy et al. |
| 6,393,254 | B1 | 5/2002 | Pousada Carballo et al. |
| 6,396,432 | B1 | 5/2002 | Riemschneider et al. |
| 6,469,992 | B1 | 10/2002 | Schieder |
| 6,687,506 | B1 | 2/2004 | Girod |
| 6,697,008 | B1 | 2/2004 | Sternowski |
| 6,882,310 | B1 | 4/2005 | Drentea |
| 7,590,200 | B2 | 9/2009 | Fujii et al. |
| 7,596,352 | B2 | 9/2009 | Ding et al. |
| 2002/0012411 | A1 | 1/2002 | Heinzl et al. |
| 2003/0054755 | A1 | 3/2003 | Zehavi et al. |
| 2003/0112905 | A1 | 6/2003 | Heinzl et al. |
| 2003/0143943 | A1 | 7/2003 | Kline |
| 2004/0203905 | A1 | 10/2004 | Cuffaro |
| 2004/0239559 | A1 | 12/2004 | King et al. |
| 2005/0249266 | A1 | 11/2005 | Brown et al. |

(Continued)

OTHER PUBLICATIONS

R. Learned, et al., Interference Multiple Access Wireless Network Demonstration Enabled by Real-Time Multiuser Detection, IEEE Radio and Wireless Symposium, Orlando, Florida (Jan. 2008).

(Continued)

*Primary Examiner* — Shaima Q Aminzay
(74) *Attorney, Agent, or Firm* — Leo Zucker; Daniel J. Long

(57) ABSTRACT

A tactical radio includes a radio frequency (RF) processing module having a receiving component path and a transmitting component path. A signal processing module coupled to the RF processing module includes a jammer detection stage for identifying a type of jamming signal on a channel over which communications signals are received simultaneously. A jammer model stage in the signal processing module produces a waveform model for the jamming signal, and a channel model stage replicates propagation conditions on the channel and produces a corresponding cancellation signal. The cancellation signal is coupled at such a level into the receiving component path so as to cancel the jamming signal from received communications signals at the front end of the radio. Any residual jamming signals may then be removed by a secondary jamming cancellation stage operating at baseband.

17 Claims, 6 Drawing Sheets

U.S. PATENT DOCUMENTS

2006/0079265 A1    4/2006    Masuda
2007/0200688 A1*    8/2007    Tang et al. ............... 340/426.18

OTHER PUBLICATIONS

M. Zhodzishsky, et al., In-Band Interference Suppression for GPS/GLONASS, <http://storage.javad.com/downloads/papers/interference_suppression.pdf> (undated).

Timewave Technology Inc., ANC-4 Antenna Noise Canceller, Instruction Manual (Mar. 12, 2003).

MFJ Enterprises, Inc., MFJ-1026 Noise Canceling Signal Enhancer, Instruction Manual (undated).

R. Jain, Channel Models—A Tutorial (V1.0), available on-line from jain@acm.org (Feb. 21, 2007).

* cited by examiner

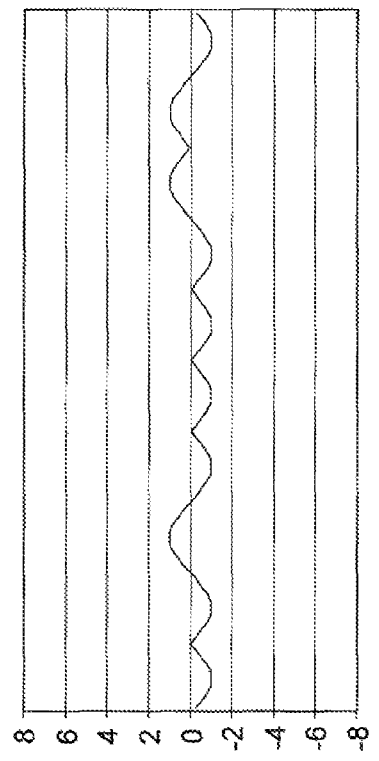
FIG. 2(b) DESIRED SIGNAL – BPSK MODULATED WITH AMPLITUDE 1
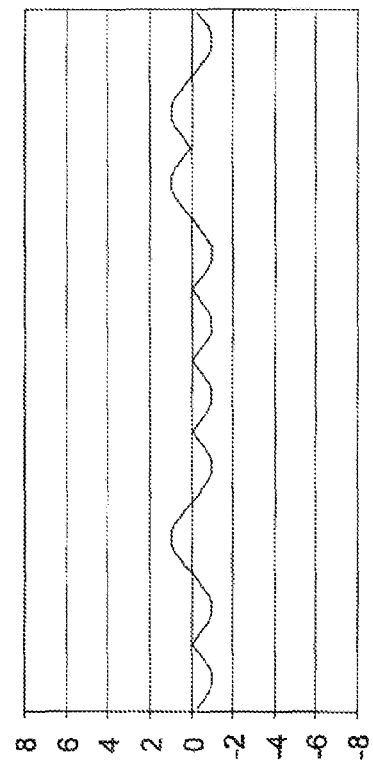
FIG. 2(d) RECOVERED DESIRED SIGNAL AFTER TWYJ PROCESSING
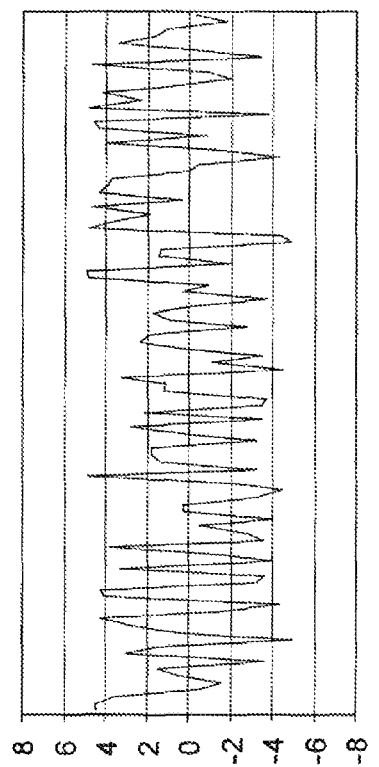
FIG. 2(a) JAMMER SIGNAL – RANDOM SIGNAL WITH AMPLITUDE 5
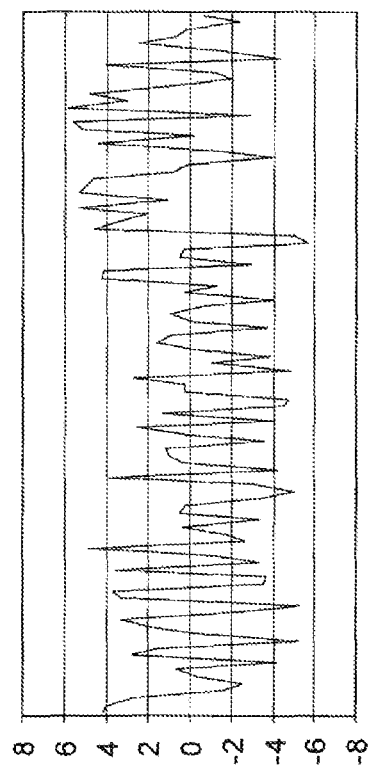
FIG. 2(c) DESIRED SIGNAL BURIED UNDER JAMMER

TACTICAL RADIO AND RADIO NETWORK WITH ELECTRONIC COUNTERMEASURES

CROSS-REFERENCE TO RELATED APPLICATIONS

This application claims priority under 35 U.S.C. §119(e) of U.S. Provisional Patent Application No. 61/216,178 filed May 14, 2009, titled "Tactical Radio and Network With Electronic Countermeasures" and U.S. Provisional Patent Application No. 61/181,931 filed May 28, 2009, titled "Geometric Multi-user Detector for Communicating Through Constant Modulus Interference", both of which applications are incorporated by reference.

BACKGROUND OF THE INVENTION

1. Field of the Invention

The present invention relates generally to communications networks, and to a radio capable of operating in the presence of interference or jamming on network channels.

2. Discussion of the Known Art

Cellular telephones and other commercial off-the-shelf wireless devices are used by enemy combatants to trigger improvised explosive devices (IEDs) near roads where friendly forces and civilians are expected to travel. For example, a cell phone may be wired to an IED so as to detonate the device in response to a wireless call signal initiated by an enemy nearby. To counter the threat effectively, it becomes necessary to jam each radio frequency (RF) channel the enemy could possibly use to transmit the triggering call signal to a given location, including channels normally used for communications among military and civilian personnel. But while such "friendly" jamming can work to prevent the enemy from triggering explosives by use of common wireless devices, it is likely to degrade communications severely among friendly forces over the channels being jammed.

U.S. Pat. No. 6,687,506 (Feb. 3, 2004) discloses apparatus for disabling radio (i.e., cellular) telephones inside public premises such as theaters, schools, restaurants and the like, by jamming the reception of call signals entering the premises. See also, U.S. Pat. No. 6,393,254 (May 21, 2002), U.S. Pat. No. 7,050,755 (May 23, 2006), and U.S. Pat. No. 6,112,052 (Aug. 29, 2000). The '052 patent describes a remote controlled device for jamming enemy radio signals wherein a number of the devices are concealed and deployed at different locations in enemy territory.

U.S. Pat. Application Pub. No. 2002/0012411 (Jan. 31, 2002) and Pub. No. 2003/0112905 (Jun. 19, 2003) disclose a global positioning system (GPS) receiver capable of functioning in the presence of interfering or jamming signals by the use of notch filters. Both documents also state at par. [0011] that the disclosed approach is preferable over one that uses "cancellation" wherein a replica of the jamming signal is generated and then subtracted from the received signal. Such a cancellation process is disclosed in an article by M. Zhodzishsky, et al., "In-band Interference Suppression for GPS/GLONASS", available on the Internet at <http://storage.javad.com/downloads/papers/interference_suppression.pdf>. The article describes the synthesis or modeling of detected narrowband GPS interferers and their active cancellation in a receiver.

So-called antenna noise canceller devices are commercially available from Timewave Technology Inc., model # ANC-4, and MFJ Enterprises Inc., model #1026. Both devices make use of a separate "noise antenna" arranged to sense strong RF noise signals from nearby sources such as light dimmers, fluorescent lamps, motors, power lines, lightening bursts, and the like. Signals sensed by the noise antenna are correlated with all RF signals sensed by a main receiving antenna, and proper amplitude and phase parameters are determined so that only the RF noise signals are canceled from other desired RF signals before entering the front end of the receiver.

The mentioned noise canceller devices obtain an essentially pure sample of a nearby source of noise or interference, correlate the sample with a desired communications signal from a more distant source, and determine the correct parameters to enable noise cancellation. In military and other tactical operations, however, an enemy jammer transmitter is usually located far from a receiver attempting to detect friendly communications signals on the jammed channels. This makes it impossible to obtain a pure sample of the jamming signal waveform alone. Therefore, to enable cancellation under such conditions, a proper model of the jamming signal waveform must be synthesized locally at the receiver.

U.S. Pat. Application Pub. No. 2003/0054755 (Mar. 20, 2003) describes a Coded Orthogonal Frequency Division Multiplexing (COFDM) receiver with an "anti-jamming" (AJ) processor. The receiver detects multiple subcarriers of a received signal carrying data, wherein one or more of the subcarriers may be subject to unintentional interference from cordless telephones, Bluetooth® transmitters, or other devices authorized to transmit at radio frequencies that are at or near the frequencies of the subcarriers. Any interference on each subcarrier is assessed, and corresponding reliability metrics are assigned to the subcarriers. The received signal is demodulated using the reliability metrics to recover the data, according to the '755 publication. See also, U.S. Pat. Application Pub. No. 2003/0143943 (Jul. 31, 2003).

Sophisticated wireless military communication systems and jamming systems have been developed as disclosed in, e.g., R. A. Poisel, Modern Communications Jamming Principles and Techniques, Artech House (2004); and O. Holt, "Technology survey: Sampling of communications jammers", J. Electronic Defense, pages 43 to 46 (February 2008), all relevant contents of which are incorporated by reference.

In tactical situations involving a dense deployment of multiple RF communication systems, interference among the various systems can severely limit their individual performance. Improving spectrum interoperability among the systems is paramount if adverse effects of spectrum congestion are to be avoided. One technique currently being developed for efficient spectrum usage is so-called Dynamic Spectrum Access (DSA) as described in A. N. Mody, et al., "Recent advances in cognitive communications", IEEE Comm. Mag., vol. 45, no. 10, pp. 54 to 61 (October 2007), all relevant contents of which are incorporated by reference. Radios using this technique detect, track, and predict frequency bands occupied by a potential interferer in time, frequency, and space, and the radios shift their operating frequencies accordingly in order to avoid the interference.

It is common to communicate on RF channels, and methods of disrupting or jamming such communications are also generally well known. As far as is known, however, a technique that allows a user to communicate reliably on a RF band or channel while the channel is jammed by the user or another source, has not been disclosed. In particular, there is a need for a radio that can communicate with other radios on one or more channels of a network while the same channels are jammed by either friendly or hostile entities.

Moreover, current techniques for enabling communications in the presence of jamming require a significant reduction in transmission data rates due to the need for powerful low rate error correction codes, spreading increases (direct sequence or frequency hopping), and certain collision avoidance techniques. Accordingly, there is also a need for a radio that can provide full-rate anti-jam (FRAJ) wireless communications in the presence of jamming signals whether friendly or hostile, as well as nearby RF emitters that can act as "unintentional" jammers.

SUMMARY OF THE INVENTION

According to the invention, a radio includes a radio frequency (RF) processing module having a receiving component path and a transmitting component path, and a signal processing module coupled to the RF processing module. The signal processing module includes a jammer detection stage operative to identify a type of jamming signal on a channel over which desired communications signals are received simultaneously by the radio, a jammer model stage configured to produce a model of the jamming signal waveform, and a channel model stage configured to replicate propagation conditions on the channel and to output a corresponding cancellation signal. The cancellation signal from the channel model stage is coupled to an input of the transmitting component path of the RF processing module, and the transmitting component path is coupled at a determined level to the receiving component path so that the cancellation signal operates to eliminate the jamming signal from the desired communications signals.

For a better understanding of the invention, reference is made to the following description taken in conjunction with the accompanying drawing and the appended claims.

BRIEF DESCRIPTION OF THE DRAWING

In the drawing:

FIGS. 2(*a*) to 2(*d*) illustrate jamming and communications signal wave-forms according to the invention;

DETAILED DESCRIPTION OF THE INVENTION

Figure 1:
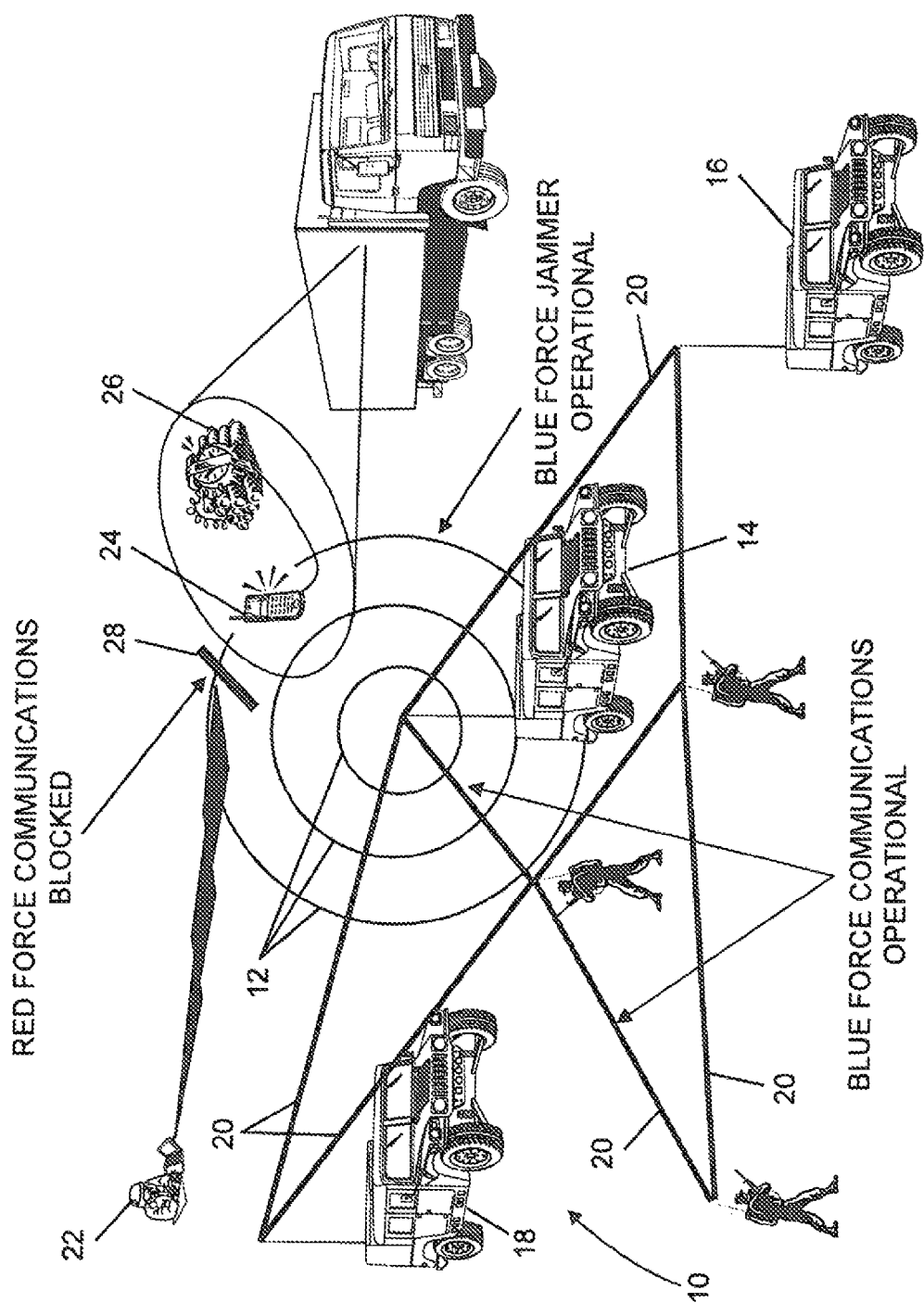
FIG. 1 illustrates a tactical radio network according to the invention, as deployed in a hostile environment.

The inventive radio and network allow friendly forces including military and civilian personnel to communicate reliably with one another notwithstanding the presence of jamming. In one embodiment, "friendly" jamming signals may be produced and transmitted by fixed or portable radios when operated by their users to prevent remote triggering of explosives that may be hidden nearby, as well as to deny enemy forces the use of existing communications systems. Each radio therefore allows the user to "talk while you jam" (TWYJ).

A TWYJ radio may, for example, take the general form of a cellular radio telephone with the addition of a personal electronic countermeasures (PECM) or jammer mode of operation wherein the radio emits certain jamming signals especially suited to prevent nearby cell phones from generating or responding to wireless call signals, as well as to disrupt enemy communications. Users of the radios may nonetheless communicate with one another using conventional baseband waveforms on the jammed channels. It is contemplated that only about one watt of RF power is needed to radiate the jamming signals effectively from a handheld version of the radio. Higher power may be obtained with radios constructed for mounting in trucks, tanks, and other vehicles.

The waveform structure of jamming signals radiated from the inventive radios and other "friendly" jammers in a tactical communications network, is preferably defined so that the waveform can be predicted and synthesized locally by a given radio having knowledge of a predetermined key. It is also preferable that the key structure be changed at intervals also known by the receiving radio according, e.g., to the time of day (ToD). Thus, when in a receive mode, a TWYJ radio has the capability to cancel jamming signals transmitted at any given time from other network sources, and the radio can communicate with other network radios on the jammed channels. In addition, the radios are preferably provided with a database or "dictionary" of known enemy jamming signal waveforms, and have signal processing components that enable the radios to detect and classify received enemy jamming signals, estimate the parameters needed to synthesize the jamming signals locally, and cancel the jamming signals from friendly communications signals.

For example, when entering a hostile zone, each soldier may be equipped with a handheld TWYJ radio having both cell phone and jamming capability. If an active jamming mode is selected by the soldier, the radio emits a friendly jamming signal effective to jam cellular and/or other channels known to be used by an enemy. As the soldier approaches an IED wired to detonate in response to a cellular call signal, the effectiveness of the radio to block the call signal will increase. TWYJ radios held by the other soldiers can then use the predetermined key and/or other known information to reconstruct and cancel the jamming signal from friendly communications signals. Thus, any friendly voice or other tactical information transmitted on the jammed channels will remain intelligible to all soldiers on the mission.

FIG. 1 illustrates a tactical radio network 10 according to the invention when deployed in a hostile environment. A friendly jamming signal 12, depicted by concentric circles, is radiated from a mobile TWYJ radio installed in a truck 14 moving in a convoy with other trucks 16 and 18. Friendly force radio communication signals 20, depicted by solid lines, are unaffected by the jamming signal 12 even though the communication signals 20 are radiated simultaneously with the jamming signal 12 on the same network channel or frequency. Meanwhile, an enemy transmission from an insurgent 22 attempting to call a cell phone 24 wired to detonate a roadside bomb 26, is effectively blocked (at 28) by the jamming signal 12.

If the waveform of a first signal on a given RF channel is fully known before reception at a receiver, the waveform theoretically consumes no channel capacity at the receiver. That is, the receiver should be able to decode information from the waveform of a second signal received on the same channel and at the same data rate the information was encoded on the second signal as though the first signal was not present. The inventive radios are therefore constructed to have knowledge of the properties of friendly jamming signal waveforms before the waveforms are received, and to estimate channel properties not immediately known such as, e.g., received signal amplitude, phase, timing offset, multipath or the like. The jamming signal is treated merely as a "see through" or "look through" signal, and the communications link suffers little if any reduction in data rate. That is, once the jamming signal is correctly estimated and tracked, it is no longer random and has zero entropy. The communications signal exists jointly with the jamming signal and the total entropy in the received signal is attributable entirely to the communications signal of interest. The signal of interest can thus retain its full capacity or data rate as if the jamming signal does not exist.

Even if only some parameters of the jamming signal are correctly estimated, the entropy of the signal can be greatly reduced simply by treating those parameters of the received jamming signal that remain unknown as worst-case random variables. In such a partial state tracking example, the total entropy is still due mostly to the signal of interest and only partly due to the jammer, and the data rate of the signal of interest can exist at a rate close to an ideal jammer-free rate. This is in contrast to current approaches wherein the jamming signal is treated as noise even if it has a great deal of structure that can be fully known or estimated at the receiver. That is, in current models of the problem, the jammer is assumed to fulfill its maximum potential for entropy and to reduce the remaining channel capacity for the signal of interest accordingly. In the inventive radios and network, the jamming signal is afforded the least possible entropy, including zero entropy. The communication system (e.g., rate, spreading, etc.) is constructed to overcome a minimal rather than a maximal model of the jammer. The receiver only needs to estimate the jamming signal parameters and then mitigate the jamming signal, as described more fully below.

FIGS. 2(a) to 2(d) are examples of waveforms to illustrate the operation of the inventive radios and the network 10. In FIG. 2(a), a pseudo-noise (PN) waveform is transmitted as a jamming signal having a relative peak amplitude of five, using a random key that is known to each network radio. Assume a desired communications signal in the form of a BPSK modulated waveform as in FIG. 2(b) is transmitted on the same channel as the jamming signal of FIG. 2(a), but with a relative peak amplitude of one. FIG. 2(c) illustrates a sum of the jamming signal and the desired signal, forming a composite RF signal on the channel for reception by a network radio. Note that in the composite signal, the desired communications signal is completely swamped by the jamming signal and would ordinarily be unrecoverable. But since the radio has prior knowledge of the jamming PN waveform, it can operate to synthesize an exact copy of the PN waveform and subtract it from the received composite signal. The result is illustrated in FIG. 2(d), wherein the recovered communications signal is virtually identical to the transmitted communications signal in FIG. 2(b).

Figure 3:
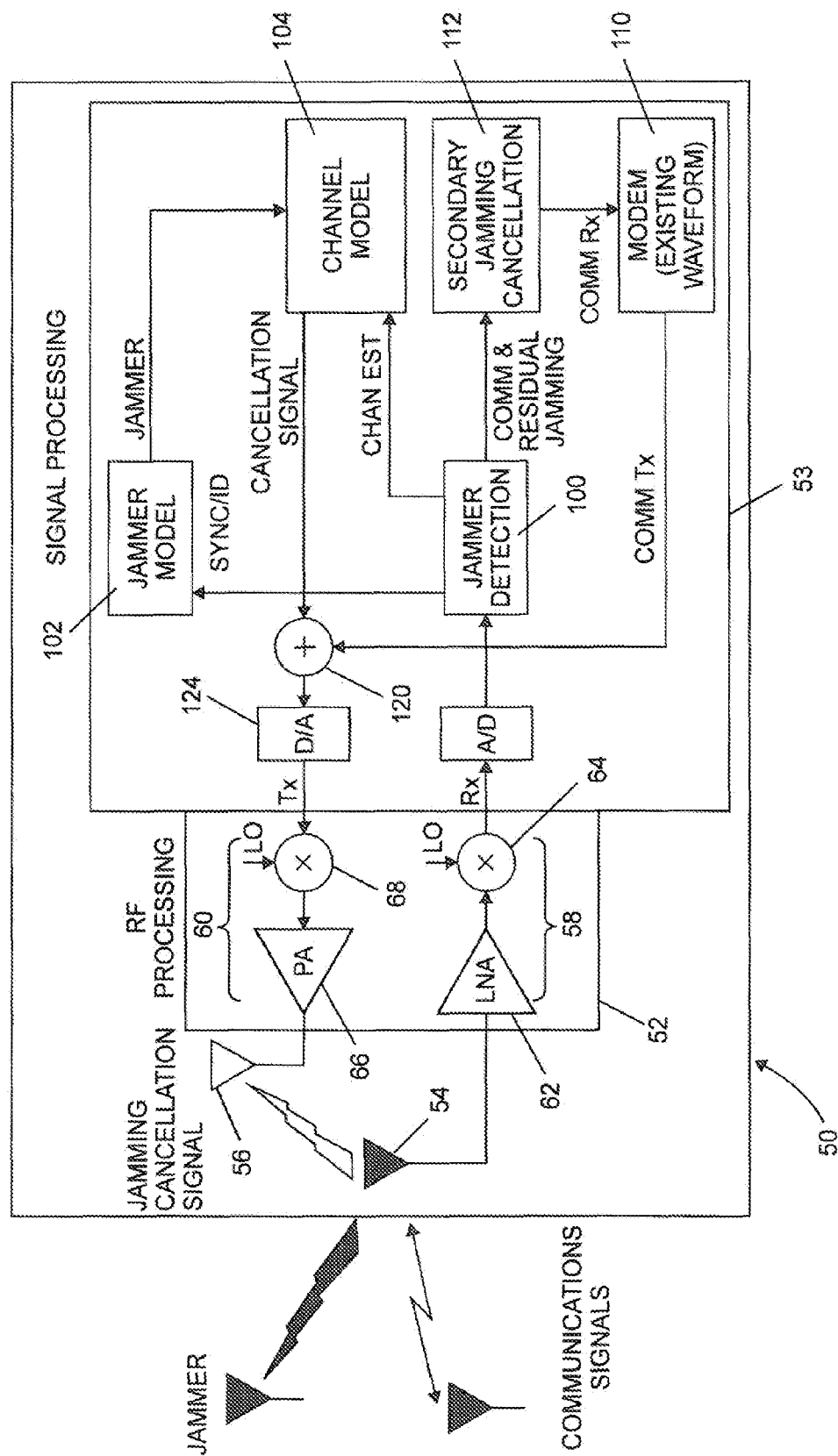
FIG. 3 is a block diagram of an embodiment of a network radio according to the invention.

FIG. 3 is a schematic block diagram of an embodiment of an inventive network radio 50 according to the invention. The figure is simplified to show only key components. Other components such as filters placed at various points in the radio 50 would be apparent to those skilled in the art.

In the illustrated embodiment, the radio 50 has a RF processing module 52, a signal processing module 53, a RF receive antenna 54, and a RF transmit antenna 56. The RF processing module 52 includes a receiving component path 58 and a transmitting component path 60. The receiving component path 58 includes a low noise amplifier (LNA) 62 having an input coupled to the receive antenna 54; and a mixer 64 having a first input coupled to an output of the LNA 62, a second input coupled to a local oscillator (LO), and an output coupled to a composite receive signal input (Rx) of the signal processing module 53 in the radio 50.

The transmitting component path 60 includes a power amplifier (PA) 66 an output of which is coupled to the transmit antenna 56; and a mixer 68 having an output coupled to an input of the PA 66, a first input coupled to a local oscillator (LO), and a second input coupled to a composite transmit signal output (Tx) from the signal processing module 53.

In the embodiment of FIG. 3, the radio 50 is constructed and arranged so that when in a receive mode of operation, the radio 50 emits a jamming cancellation signal from the transmit antenna 56 to match an ambient jamming signal in amplitude while being 180 degrees out of phase with the jamming signal. Accordingly, the effect of the jamming signal incident on the receive antenna 54 is cancelled or substantially reduced, and the ambient jamming signal is prevented from saturating the LNA 62 at the front end of the RF processing module 52. As mentioned, the jamming cancellation signal preferably includes components needed to compensate for any effects the transmission channel may have on the jamming signal, e.g., multipath.

While the embodiment in FIG. 3 is preferred, alternative embodiments may use a directional coupler to inject the cancellation signal from the transmit path 60 directly into the receive path 58 at a point between the receive antenna 54 and the LNA 62, so that the cancellation signal does not radiate from the transmit antenna 56. A directional coupler may instead be placed between the receive mixer 64 and the receive input (Rx) of the signal processor 53, and a switch placed between the transmit antenna 56 and the PA 66, wherein the switch is closed during normal transmit operation to allow radio signals intended for transmission to reach the antenna 56. If desired, the switch may be set open while the radio 50 is in receive mode so that the jamming cancellation signal does not radiate from the antenna 56, but, instead, follows an internal path enabled by directional couplers and switches. For embodiments employing directional couplers and switches, the transmit and the receive antennas 54, 56 may be replaced with a single shared antenna as shown, for example, in FIG. 4 and described below.

Figure 4:
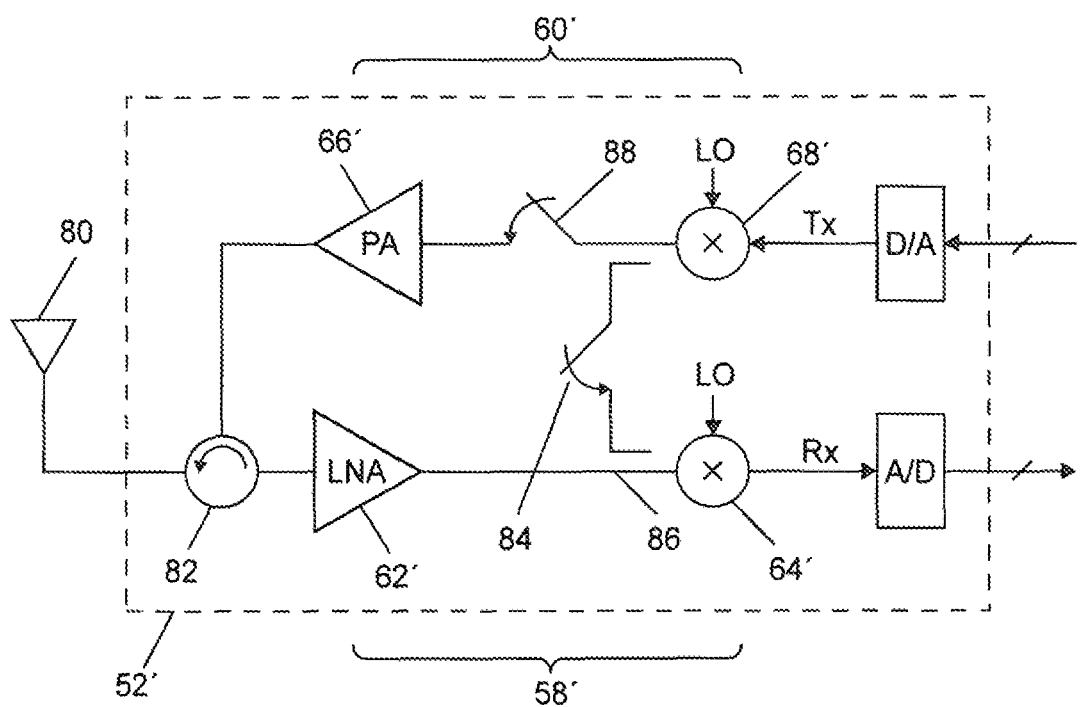
FIG. 4 shows a modification of the embodiment of the radio in FIG. 3.

FIG. 4 shows a modification of the embodiment of FIG. 3, wherein a single radio antenna 80 and a circulator 82 are arranged in a known manner to eliminate the need for the separate receive and transmit antennas 54, 56 in FIG. 3. Components that are the same or similar to those in FIG. 3 have corresponding reference numbers followed by an apostrophe. In the embodiment of FIG. 4, the jamming cancellation signal is injected at a determined level into the receiving component path 58' by coupling the output of mixer 68' in the transmitting component path 60', to an input of the mixer 64' in the receiving component path 58' through a switch 84 and a directional coupler 86. Alternatively, the directional coupler 86 may instead be placed so as to couple the output of the mixer 68' to a point between the circulator 82 and the LNA 62'. Either choice may have its own advantages, but the latter (a point between the circulator 82 and the LNA 62') is generally preferred. The switches may be controlled by the signal processing module 53 according to whether the radio 50 is receiving or transmitting at any given time. When the radio 50 is transmitting, a switch 88 provided between the output of mixer 68' and the input of PA 66' is closed to route the transmit signals to the PA 66, and the switch 84 is open. When receiving, the switch 88 is open and switch 84 is closed so that the jamming cancellation signal is injected at the proper level into either the receiving mixer 64' or the LNA 62 through the coupler 86', depending on the chosen configuration.

In the signal processing module 53 of the radio 50 in FIG. 3, the presence of jamming signals is detected by a jammer detection stage 100 that can be realized by known digital signal processing techniques. For example, jammer detection stage 100 may be configured to (i) identify the type of jammer (if not already known), (ii) determine the timing and frequency offsets of the jamming signal by accounting for delays and the like, (iii) output the jammer identification and a corresponding synchronization (sync) signal to a jammer model stage 102 using known communications synchronization techniques, (iv) determine a jammer channel estimate, and (v) output the channel estimate to a channel model stage 104. For example, techniques that may be applied by the jammer detection stage 100 to identify various types of jammers are disclosed in A. N. Mody, et al., Machine Learning Based Cognitive Communications in White as Well as the Gray Space, IEEE MILCOM, Orlando, Fla. (October 2007). See also, U.S. Pat. No. 6,229,998 (May 8, 2001) which is incorporated by reference. Methods of synchronizing with the jamming signal may be the same or similar to known methods used for synchronizing with interfering communications signals. See, e.g., R. Learned, et al., Interference Multiple Access Wireless Network Demonstration Enabled by Real Time Multiuser Detection, 2008 IEEE Radio and Wireless Symposium, Orlando, Fla. (January 2008), and U.S. Pat. Application Pub. No. 2004/0239559 (Dec. 2, 2004) which is incorporated by reference.

As mentioned, the jammer detection stage 100 is configured in a known manner to estimate the jammer channel condition or response, and to feed the estimate to the channel model stage 104. See, e.g., U.S. Pat. No. 6,469,992 (Oct. 22, 2002), U.S. Pat. No. 7,590,200 (Sep. 15, 2009), and U.S. Pat. No. 7,596,352 (Sep. 29, 2009) which are incorporated by reference.

The jammer model stage 102 is constructed and arranged in a known manner to produce or generate a true model of the jamming signal waveform as initially transmitted from the jamming source, based on the jammer ID and sync signal input from the jammer detection circuit 100, and an associated database of known jamming signal waveforms. See, e.g., U.S. Pat. No. 4,743,905 (May 10, 1988) and U.S. Pat. No. 6,697,008 (Feb. 24, 2004), both of which are incorporated by reference.

The channel model stage 104 produces a jammer cancellation signal in accordance with the jamming signal waveform supplied by the jammer model stage 102, and the channel estimate provided by the jammer detection stage 100. The channel model stage 104 may take the form of, for example, an adaptive filter constructed in a known manner to respond to the channel estimate provided by the jammer detection stage 100, wherein the output of the jammer model stage 102 is applied to an input of the filter. Such an approach to channel estimation and the construction of a filter to mimic the channel is well known. For example, if the channel estimates are in the form of coefficients for an adaptive FIR filter, such a filter can be used to model the impact of the channel on the jamming signal.

The cancellation signal output from the channel model stage 104 is coupled to a first input of an adder 120, and the output of adder 120 is input to a digital-to-analog (D/A) converter 124. The output of the D/A converter 124 constitutes the transmit signal (Tx) which is coupled to an input of the mixer 68 in the transmitting component path 60 of the radio 50. A second input of the adder 120 is coupled to a communications transmit signal (Comm Tx) output of a communications modem 110, described below.

The channel estimate (e.g., fading, multipath and doppler) and the sync signal output from the jammer detection stage 100 may be modified if necessary to improve the cancellation of a received jamming signal from communications signals of interest. It is contemplated that as much as 40 dB of cancellation can be achieved, with 20 to 30 dB being typical.

The radio 50 may transmit and receive communication signals in a normal manner as long as the level of any residual jamming signal remains below a determined level. In the case of a "friendly" jammer, a warning signal may be transmitted to identify those times when friendly jamming signals are scheduled to start and to stop, followed by a training sequence to enable the jammer detection stage 100 to estimate the channel condition more accurately. Thus, the radios 50 can synchronize their operation to cancel friendly jamming signals when such signals are present, and suppress their self generated cancellation signals to avoid self saturation when friendly jammers are not operating. The modem 110 may respond to and employ conventional communication waveforms, for example, an IEEE 802.16 format may be used without modification.

It is possible that the primary cancellation loop operating at the front end of the radio 50 (i.e., at the antennas 54, 56 or within the RF processing module 52 depending on the specific embodiment) may not provide sufficient jammer cancellation in certain situations. Its main purpose is to ensure that the front end of the radio 50 is not overwhelmed by a jamming signal. Accordingly, as shown in FIG. 3, the receive communications signal Comm Rx may be applied to an input of a secondary jamming cancellation stage 112 in a secondary cancellation loop. The secondary cancellation loop may be implemented using, e.g., known multi-user detection (MUD) techniques. The radio architecture shown in FIG. 3 is based on a successive interference cancellation (SIC) type of MUD, but other known and more sophisticated joint detection techniques achieving suppression levels has high as 30 dB may also be applied with a goal of, e.g., total jammer cancellation on the order of 60 dB. The secondary cancellation stage 112 may also perform some of the functions of the communications modem 110 in case more complex MUD schemes are applied jointly to detect the communications and the jamming waveforms.

In the example provided below, the secondary jamming cancellation stage 112 is operative to detect communications signals in the presence of a residual constant modulus (CM) interfering signal, and may be configured as disclosed in U.S. Provisional Patent Application No. 61/181,931 filed May 28, 2009, entitled "Geometric Multi-User Detector for Communicating Through Constant Modulus Interference" and assigned to the assignee of the present application and invention. Specifically, assume the friendly network 10 is a BPSK communications system, and the interferer is a M-PSK system emitting random equiprobable symbols using a nonlinear class C or class D power amplifier. If the received random process is sampled at the symbol rate of the network 10, the received complex baseband observations may then be written as:

$$y_k = s_k + i_k + n_k \qquad \text{Eq. (1)}$$

In Eq. (1), signal $s_k$ is the friendly BPSK signal with equiprobable symbols ±1, interferer $i_k$ is an M-PSK signal with equiprobable symbols taken from $$\{\beta_l = R \exp(-j2\pi l/M) : l = \{0, \ldots, M-1\}\},$$

and $n_k$ is additive zero-mean white complex Gaussian noise with variance $P_n = \sigma^2_n$. The power of the interferer is then $P_i = R^2$.

Further assume that the communications signal, the interferer, and the noise samples are mutually independent and are independent over time. To simplify the analysis, assume also that there is no channel fading or multipath, and no timing jitter or frequency offset in the demodulator. To reduce notation to the simple i.i.d. symbol-spaced case, also assume that the communications signal and the interferer have the same symbol rates, carrier frequencies, pulse shaping filters (with the same excess bandwidths), and time delays to the receiver. Finally, assume the interferer does not saturate the LNA 62 of the radio 50, and that LNA 62 is operating in its linear region.

Figure 5:
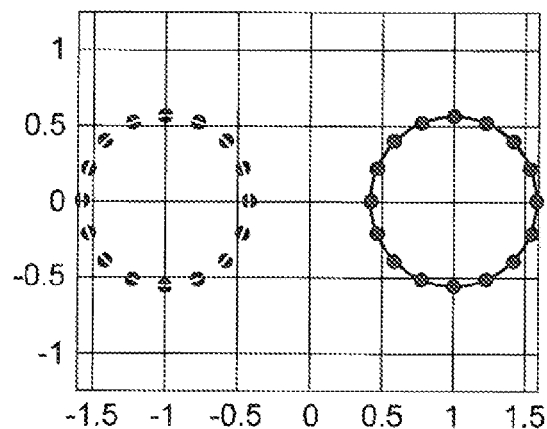
FIG. 5 shows two channel output constellations in the presence of a 16-PSK jamming signal, a jamming signal ratio (JSR) of −5 dB, and a signal-to-noise ratio (SNR) of 30 dB.
Figure 6:
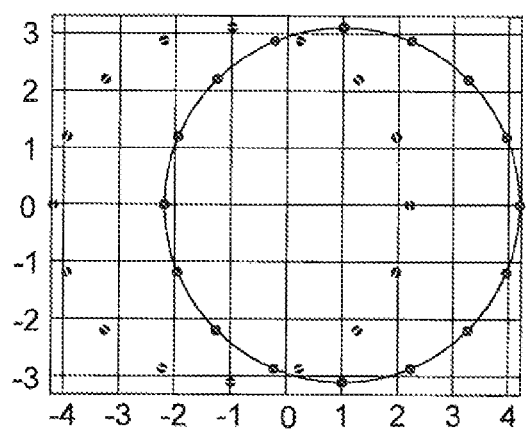
FIG. 6 shows the channel output constellations with a JSR of 10 dB and a SNR of 30 dB.
Figure 7:
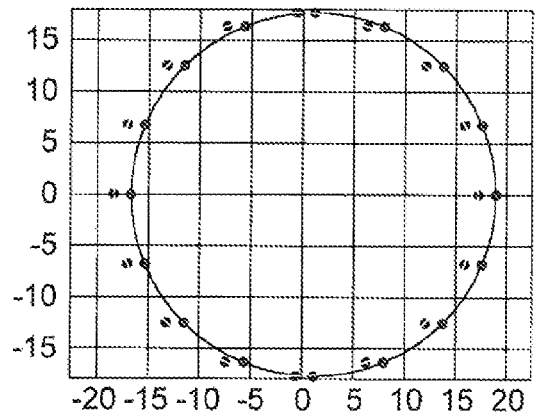
FIG. 7 shows the channel output constellations with a JSR of 25 dB and a SNR of 30 dB.

To understand the relationship of the three components in Eq. (1), consider a superimposed signal-plus-interference-plus-noise constellation. FIGS. 5 to 7 are plots of such constellations for small, medium, and large jammer-to-signal ratio (JSR) values. The circular configurations in the constellations of FIGS. 5 to 7 are due to a 16-PSK interferer, and the centers of the two circles in each figure correspond to the two BPSK communications symbols. In FIGS. 5 to 7, the BPSK constellation is kept constant with $s_k = \pm 1$, and the radius of the circles is scaled as a function of the power of the interferer. The size of the ball at each constellation point is governed by the noise variance $\sigma^2_n$.

Specifically, FIG. 5 shows two channel output constellations in the presence of a 16-PSK jamming signal, a jamming signal ratio (JSR) of −5 dB, and a signal-to-noise ratio (SNR) of 30 dB. FIG. 6 shows the channel output constellations when the JSR is 10 dB and the SNR is 30 dB. FIG. 7 shows the channel output constellations when the JSR is 25 dB and the SNR ratio is 30 dB.

For a small JSR (FIG. 5), the circles do not overlap or cross the imaginary axis (x=0), so all of the observations corresponding to $s_k = +1$ remain in the right half plane (RHP) and those corresponding to $s_k = -1$ remain in the left half plane (LHP). For a medium JSR (FIG. 6), the circles overlap and cross the imaginary axis, but are still quite distinct. Some of the observations corresponding to $s_k = +1$ are likely to occur in the LHP, however. Finally, for a large JSR (FIG. 7), it is harder to distinguish between the two circles, since an offset of only 2 between the centers of the circles is small if each circle is of radius 18 as shown in FIG. 7. In this case, approximately half of the superimposed constellation points corresponding to $s_k = +1$ are now in the LHP.

Based on each observation $Y_k$, a corresponding communications symbol $s_k$ should be recovered. For example, in FIG. 8, if $Y_k$ is represented by the black dot labeled observation, it must be determined whether $s_k = +1$ or $s_k = -1$ corresponding to one of the constellation points on the rightmost or the leftmost circle, respectively.

Figure 9:
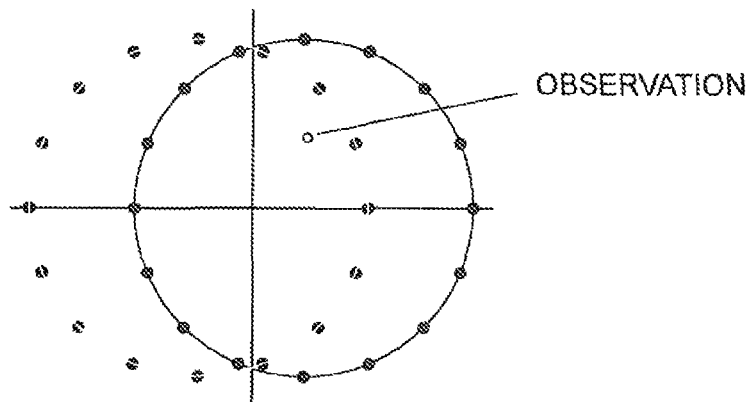
FIG. 9 is a constellation diagram illustrating the operation of a sign detector.

So-called sign detectors that completely ignore the presence of the interferer, are generally known. That is, it is well known that a sign detector is an optimal coherent detector for a BPSK signal with white Gaussian noise, but without interference. The sign detector judges that $s_k = +1$ if complex $Y_k$ lies in the RHP, and that $s_k = -1$ if $Y_k$ is in the LHP. For example, since an observation point shown in FIG. 9 is in the RHP, it is mapped to $s_k = +1$. If no interferer is present, the detection error probability, e.g., the probability of judging that $s_k = +1$ when $s_k = -1$ was transmitted, may be expressed as $$P_e^{BPSK} = \frac{1}{2} \mathrm{erfc}\left( \sqrt{\frac{P_s}{P_n}} \right) \quad \text{Eq. (2)}$$

where Ps and Pn are the signal and the noise powers, and erfc represents the complementary Gaussian error function $$\mathrm{erfc}(x) = \frac{2}{\sqrt{\pi}} \int_x^\infty \exp(-z^2) dz. \quad \text{Eq. (3)}$$

See, S. Haykin, *Communication Systems*, John Wiley & Sons (4th ed. 2001).

Jammers actually carry far less "information" than assumed by the white noise Gaussian model noted above for the sign detector. In fact, it is known that certain jammers can be categorized and estimated, for example, by detecting a frequency sweep characteristic of a CW jammer, or by detecting certain "noise" characteristics of a FM jammer.

Figure 8:
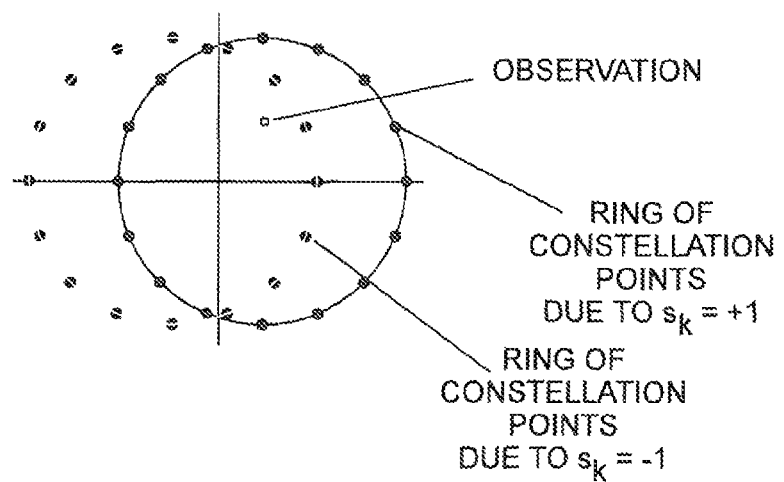
FIG. 8 is an observation constellation diagram.
Figure 10:
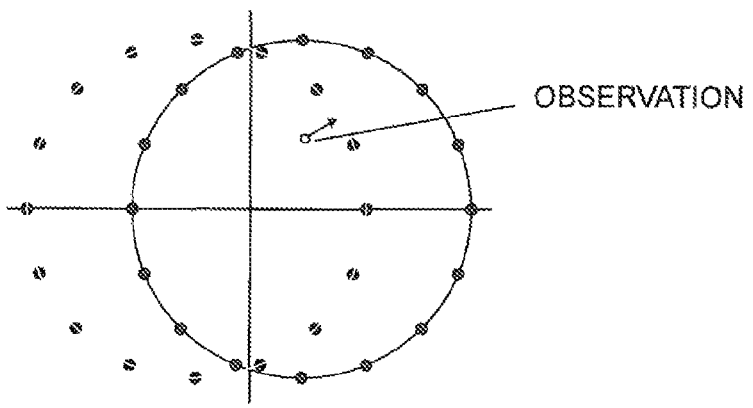
FIG. 10 is a constellation diagram illustrating operation of an inventive circle detector.

By examining the receiver observation constellation in FIG. 8, it can be seen that all the constellation points on the rightmost circle correspond to $s_k = +1$, and those on the leftmost circle correspond to $s_k = -1$. A preferred detector, referred to herein as a "circle" detector operates to map each observation $Y_k$ to the closest circle, as shown in FIG. 10. Taking advantage of the CM property of the interferer, the circle detector determines that $s_k = +1$ if $y_k$ is closer to the rightmost circle, and determines that $s_k = -1$ if $y_k$ is closer to the leftmost circle. Note that the probability of an observation being equidistant from both circles is zero. The Euclidean distance from a point $y_k$ to a circle of radius R centered at point c has the form $$d(y_k, R, c) = |R - |y_k - c||, \quad \text{Eq. (4)}$$

wherein the inner absolute value is a complex operation, while the outer absolute value is real. Thus, in terms of computational complexity, the circle detector requires two Euclidean distance calculations for each received observation in order to determine which of the two circles is closest the observation.

To derive an analytical approximation for the detection error probability of the circle detector, the common approximation of considering only the nearest neighbor constellation points under the alternative cases of $s_k = \pm 1$, is used. See A. N. Mody, et al., cited earlier. In this case, consider the distance from a particular constellation point lying, e.g., on the rightmost circle to the nearest point on the leftmost circle. In particular, if we define $$d_l = d(\beta_l - 1, \sqrt{P_i} = R, 1), \text{ for } l = 0, \ldots, M-1, \quad \text{Eq. (5)}$$

then $$P_e^{circle} \approx \frac{1}{2M} \sum_{l=0}^{M-1} \mathrm{erfc}\left( \frac{d_l}{2\sqrt{P_n}} \right). \quad \text{Eq. (6)}$$

A multi-channel embodiment of the inventive radio 50 may be provided in the form of, for example, a four channel radio operating at approximately 5.8 GHz utilizing two channels for a multiple input, multiple output (MIMO) instance of the IEEE 802.16 protocol, with two channels performing a jamming function also at the 5.8 GHz frequency. The jamming signal waveform may consist of a O-QPSK signal roughly 20 MHZ in bandwidth, generated by using a pseudo noise code from a maximal length sequence generator operating from keying material generated from a 256 bit AES, with the key changed once each second. More sophisticated jamming algorithms may be used, as long as the algorithm is such that when the keying material and other optional control data such as time of day (ToD) are provided to the radio 50, the radio is capable of predicting the transmitted jamming signal waveform. The jamming signal may also include an initialization vector (V) which, when combined with the keying material, allows the jamming signal to be canceled. A ToD based system is currently preferred.

As disclosed herein, a jamming signal is transmitted by one or more radios or nodes in a tactical network, and the waveform of the signal can be at least partially predicted or derived by other radios operating in the network. The jamming signal may or may not be modulated with additional information. If the jamming signal waveform is sufficiently known by all radios at any given time, a given radio can synchronize with the waveform, predict its future values, and cancel it from other friendly communications, e.g., voice signals, received simultaneously by the radio on the same channel. The channel remains useful to all radios in the network, and waveforms used to produce desired communications signals may be chosen from among existing waveforms including, inter alia, IEEE 802.16, cellular GSM, CDMA 2000, WNW, SRW, and IEEE 802.11.

The inventive concept allows enhanced spectrum efficiency, and reduces the need for spectrum coordination between friendly jammers and radio users who need to conduct important communications on common channels. By enabling full data rate communications in the presence of jamming, communication links suffer no data rate "slow down" as occurs in current anti-jam methods such as frequency spreading or hopping, or cognitive collision avoidance approaches.

It will be understood that the present invention may also be used to provide increased low probability of detection (LPD), low probability of intercept (LPI), low probability of exploitation (LPE), and low probability of geolocation (LPG). While friendly jamming signals may be transmitted to thwart enemy communications and other signaling, such signals can also be used to avoid an enemy intercept of sensitive friendly communications signals. For example, a radio or other friendly node whose location is not sensitive may transmit a jamming "cover" signal sufficient to prevent an enemy intercept of friendly comm signals on the jammed channels. Other friendly radios whose signals or locations are sensitive may then transmit their signals under the cover of the cover signal, at the same time and on the same channels as the jamming cover signal. The same components shown in FIGS. 3 and 4 for the radio 50 would allow the cover signal to be treated as a friendly jamming signal, so its presence would not interfere with detection of friendly comm signals by the radio.

While existing LPI/LPD/LPE/LPG techniques involve spreading of the communications signals so as to make them more difficult to detect, they do so at the price of reducing the maximum data rates the signals might otherwise carry. See, D. L. Nicholson, Spread Spectrum Signal Design: LPE & AJ Systems, Computer Science Press, Rockville, Md. (1988), incorporated by reference. The inventive radios and network have the advantage that no such spreading is required, so the maximum data rate is not lost. In addition, no changes are required to the communications signal waveforms themselves; only the mentioned cover signal (which can be a conventional jamming signal waveform) is required, together with the signal processing components disclosed herein for removing the cover signal from friendly comm signals.

As described herein, the inventive radio network 10 and radio 50 offer the following desirable features and advantages when deployed in a hostile environment:

1. Cancellation of an interfering jamming signal is achieved primarily ahead of the receiver LNA 62 or first mixer 64 to avoid saturation of the receiver.

2. If jamming becomes necessary, a user of the radio 50 can transmit a self generated jamming signal either simultaneously or serially with a desired communications signal.

3. "Friendly" jamming signals 12 transmitted from nodes of the network 10, for example, from the convoy trucks 14, 16, 18 in FIG. 1, may be selected from among a set of predetermined waveforms each of which is defined by a specific value of a known key. The key may be communicated among the network nodes, and/or defined by an algorithm having a known seed value, e.g., the time of day.

4. The friendly jamming signals may be optimized to make the most effective use of the transmitted energy, and/or include training sequences to allow the radios 50 to estimate the channel (timing, multipath, amplitudes, phases, etc.) of the jamming signals correctly. Headers may be provided on the jamming signals to indicate changes in the jamming signal waveform.

5. A network node that transmits a friendly jamming signal may be configured to receive feedback indicating that a given radio 50 can not properly estimate the jammed channel, thus allowing the node to respond by, e.g., lengthening a training sequence, or initiating a network moment of silence wherein only the jammer node transmits so as to allow all network radios to obtain a better channel estimate.

6. A network node that transmits a friendly jamming signal may be constructed and arranged in a known manner to make additional transmissions outside the jammed channel to allow a given radio 50 to obtain a better estimate of another parameter such as timing, thereby enabling the signal processing module 53 of the radio to synchronize more precisely with the transmitted jamming signal and/or achieve a higher degree of cancellation in the secondary cancellation stage 112 of the module 53.

While certain embodiments of the invention have been disclosed herein, it will be understood by those skilled in the art that various modifications and changes may be made without departing from the spirit and scope of the invention. For example, persons skilled in the art will appreciate that the inventive radios and radio network may be configured for use in domestic regional disaster relief and in homeland security. Accordingly, the invention includes all such modifications and changes that are within the bounds and scope of the following claims.

We claim:

1. A tactical radio comprising:
 a radio frequency (RF) processing module having a receiving component path and a transmitting component path;
 a signal processing module coupled to the RF processing module and including;
 a jammer detection stage coupled to an output of the receiving component path of the RF processing module and operative to identify an interfering signal as emitted from a jammer or other source of RF interference on a channel over which desired communications signals are received simultaneously with the interfering signal, and to estimate propagation conditions associated with the channel,
 a jammer model stage coupled to an output of the jammer detection stage and configured to produce a waveform model of the identified interfering signal, and a channel model stage coupled to outputs of the jammer detection and the jammer model stages, and arranged to replicate the propagation conditions estimated by the jammer detection stage and to output a corresponding cancellation signal;

wherein the cancellation signal output of the channel model stage is coupled to an input of the transmitting component path of the RF processing module, and the transmitting component path is coupled at a determined level to the receiving component path so that the cancellation signal is operative to cancel or reduce the interfering signal.

2. A radio according to claim 1, wherein the signal processing module comprises a secondary jamming cancellation stage operative to remove residual jamming signals from the desired communications signals.

3. A radio according to claim 2, wherein the secondary jamming cancellation stage includes a multi-user detector configured to detect communications signals in the presence of a constant modulus interfering signal.

4. A radio according to claim 1, including a transmit antenna coupled to an output of the transmitting component path of the RF processing module, and a receive antenna coupled to an input of the receiving component path.

5. A radio according to claim 4, wherein the transmit and the receive antennas are constructed and arranged on the radio so that the cancellation signal input to the transmitting component path radiates from the transmit antenna and is coupled into the receiving component path through the receive antenna.

6. A radio according to claim 1, including an antenna, and a circulator having a first port coupled to the antenna, a second port coupled to an output of the transmitting component path of the RF processing module, and a third port coupled to an input of the receiving component path.

7. A radio according to claim 6, including a directional coupler operatively connected between the transmitting component path and the receiving component path so that the cancellation signal input to the transmitting component path is coupled into the receiving component path through the directional coupler.

8. A radio according to claim 1, wherein the jammer detection stage is operative to output the desired communications signal including, if present, a residual interfering signal, and the radio also comprises a modem constructed and arranged to demodulate information conveyed by the communications signal output of the jammer detection stage.

9. A radio according to claim 8, wherein the modem is configured to output a transmit communications waveform for transmission from the radio.

10. A radio according to claim 9, including an adder stage having a first input coupled to the cancellation signal output of the channel model stage, a second input coupled to the transmit communications waveform output of the modem, and an output of the adder stage is coupled to the input of the RF transmitting component path of the RF processing module.

11. A radio according to claim 1, including a stage coupled to the input of the RF transmitting component path of the RF processing module and operative to produce a selected jamming signal to disrupt wireless communications or signaling by others over one or more RF channels.

12. A radio according to claim 1, including a database associated with the jammer model stage for defining a friendly jamming signal waveform known to be present at a given time.

13. A radio according to claim 12, wherein the database is operative to define the friendly jamming signal waveform according to a known key.

14. A radio according to claim 13, wherein the key is defined according to the time of day.

15. A radio network comprising:
one or more radios each of which includes:
a radio frequency (RF) processing module having a receiving component path and a transmitting component path;
a signal processing module coupled to the RF processing module and including;
a jammer detection stage coupled to an output of the receiving component path of the RF processing module and operative to identify an interfering signal as emitted from a jammer or other source of RF interference on a channel over which desired communications signals are received simultaneously with the interfering signal, and to estimate propagation conditions associated with the channel,
a jammer model stage coupled to an output of the jammer detection stage and configured to produce a waveform model of the identified interfering signal, and
a channel model stage coupled to outputs of the jammer detection and the jammer model stages, and arranged to replicate the propagation conditions estimated by the jammer detection stage and to output a corresponding cancellation signal;
wherein the cancellation signal output of the channel model stage is coupled to an input of the transmitting component path of the RF processing module, and the transmitting component path is coupled to the receiving component path so that the cancellation signal is operative to cancel or reduce the interfering signal;
one or more nodes each of which is constructed and arranged to transmit a friendly jamming signal to disrupt RF communications or signaling on one or more channels among nodes outside the network; and
each radio in the network includes a database associated with the jammer model stage for defining a friendly jamming signal waveform known to be present at a given time.

16. A network according to claim 15, wherein the database in each radio is operative to define the friendly jamming signal waveform according to a known key.

17. A network according to claim 16, wherein the key is defined according to the time of day.

* * * * *